United States Patent Office 3,294,674
Patented Dec. 27, 1966

3,294,674
HYDROCRACKING OF HYDROCARBONS WITH A SULFIDED TUNGSTEN OXIDE CATALYST ON A SILICA-ALUMINA CRACKING SUPPORT
Harold Beuther, Gibsonia, Bruce K. Schmid, McCandless Township, Allegheny County, and James R. Strom, O'Hara Township, Allegheny County, Pa., assignors to Gulf Research & Development Company, Pittsburgh, Pa., a corporation of Delaware
No Drawing. Filed Dec. 28, 1964, Ser. No. 421,705
9 Claims. (Cl. 208—111)

This invention relates to specially activated, tungsten-containing, composite hydrocracking catalysts and their preparation, and to the hydrocracking of distillate hydrocarbon oils of low-nitrogen content in the presence of such activated catalysts.

Catalytic hydrocracking of petroleum oils, shale oils and hydrogenated coal distillates having relatively high-nitrogen contents has been previously carried out at relatively severe conditions, i.e., temperatures of 400° C. or more, and at hydrogen pressures of 200 atmospheres or more, utilizing a variety of catalysts, with similar results as regards conversion, product selectivity and catalyst aging. Many of these catalysts have been found to give substantially equivalent results under these severe conditions because the large quantity of nitrogen in the feed poisons a relatively greater number of the active sites on the more active catalysts and effectively masks some of the differences that would normally distinguish these catalysts from each other. The overall results obtained in these cases are attributable in part to the catalytic effect of the partially deactivated catalysts, but also is significant part to the non-catalytic effect of the relatively severe process conditions.

More recently, it has been proposed to hydrocrack petroleum oils of low-nitrogen content at relatively mild conditions, e.g., at hydrogen pressures not exceeding 2000 p.s.i.g. and at temperatures in the range of about 600° to 750° F., with a significant part of the on-stream cycle being carried out at temperatures below about 650° F. Under these relatively mild conditions, the selection of the catalysts has been found much more important as regards the practicality of the process. Because of the lower severity of the conditions employed and because of the reduced nitrogen poisoning, the overall results obtained in these instances is much more a reflection of the activity of the catalyst than was the case with high nitrogen feeds and more severe operating conditions. As a consequence, more active catalysts are required when hydrocracking low-nitrogen feeds at relatively mild conditions.

The present invention relates to activation of tungsten hydrocracking catalysts in such a way as greatly to enhance their activity and general effectiveness for purposes of hydrocracking low-nitrogen content hydrocarbon oils. It has been found that tungsten sulfide catalysts of greatly improved activity and selectivity, and which exhibits relatively low rates of deactivation for purposes of hydrocracking hydrocarbon oil feed stocks having low-nitrogen contents, can be obtained by the use of the special sulfiding techniques of this invention. Thus, it has been found that improved tungsten sulfide catalysts are obtained by contacting tungsten oxide that has been composited with an activate, acidic, siliceous cracking support, such as a silica-alumina cracking catalyst, with hydrogen gas containing a minor proportion of a sulfiding agent at a temperature in the range of about 300° to 900° F., particularly 400° to 800° F., at an elevated pressure of at least about 100 p.s.i.g., particularly in the range of about 100 to 1000 p.s.i.g., and especially about 200 to 600 p.s.i.g., for a period effective to convert at least a substantial proportion of the tungsten to a sulfided form. Hydrogen sulfide is an example of a preferred sulfiding agent, but other equivalent materials containing divalent sulfur can be used. The catalysts activated as described above are especially adapted for use in hydrocracking hydrocarbon oils having a low-nitrogen content below about 15 p.p.m. and preferably below about 1 p.p.m., particularly when such hydrocracking is carried out at temperatures in the range of about 600° to 750° F. and at hydrogen partial pressures in the range of about 750 to 2000 p.s.i.g., and at liquid hourly space velocities in the range of about 0.5 to 8, preferably about 1 to 5 liquid volumes of oil per volume of catalyst per hour. However, the invention is not limited to the use of such conditions. The present invention includes the above-described method of activating the composite hydrocracking catalysts, the activated catalysts obtained therefrom, as well as methods of hydrocracking hydrocarbon oils having a low-nitrogen content in the presence of such catalysts.

While we do not intend to be bound by any particular theoretical considerations, we believe that the improved sulfiding activity of the sulfided tungsten catalysts of this invention may result from the formation of active, oxygen-containing sulfided tungsten catalysts, possibly in the form of a complex with the siliceous cracking support, that exhibit an especially favorable balance between hydrocracking activity and hydrogenation activity. Thus, when the hydrocracking activity of a catalyst is significantly greater than its activity for hydrogenation of unsaturated fragments produced by hydrocracking, excessive coke formation and rapid aging will result. On the other hand, when the hydrocracking activity of a catalyst is relatively low in comparison with its hydrogenation activity, little hydrocracking, i.e., conversion to lower boiling components, will occur. Available evidence strongly suggests the presence of an oxygen-containing sulfide form of tungsten having a good balance of hydrocracking and hydrogenation activities. An excellent balance of hydrocracking and hydrogenation activity is indicated by the low rate of deactivation obtained for the catalysts of this invention, and by the relatively high degree of conversion to lower boiling materials. The presence of a sulfided form of tungsten is indicated by the fact that tungsten trioxide, the starting material in the present case, is known to have little activity for either hydrogenation and hydrocracking of low-nitrogen content hydrocarbon oil distillates at mild conditions. On the other hand, the presence of oxygen in the final catalyst is indicated by the fact that the aromatics content of the gasoline product obtained with the catalysts of this invention is unusually high. This is significant because tungsten sulfide, as such, is known to have a very high hydrogenation activity, which activity tends to promote a relatively low aromatics content in the gasoline product.

As indicated above, the starting material used in the improved activating process of this invention comprises a hydrogenating component consisting of tungsten trioxide composited with an active, acidic, siliceous cracking carrier. Although the carrier must be present, any active, acidic, cracking support can be used. For example, there can be used with good results synthetic or semi-synthetic silica-alumina cracking catalysts. A specific example of a suitable support is the Triple A grade silica-alumia cracking catalyst containing 75 percent silica, marketed by American Cyanamide Company.

Other suitable cracking supports are the silica-aluminas characterized by a predonderance of pore volume in pores of less than 50 Angstroms, an alkali metal content less than 0.01 percent and having a surface acidity of 600° F. greater than 0.25 meq. of ammonia per gram, prepared as described in copending application Serial No. 374,810, filed in the name of M. M. Stewart on June 12, 1964, by mixing a freshly prepared silica sol free of cationic impurities and containing less than the equivalent of 5 percent silica, with an aqueous solution of alumina cations, and gelling. However, other active, acidic, siliceous cracking carriers can be used. For example, there can be used Super Filtrol cracking catalysts, acid-activated clays of the bentonite or montmorillonite type, or synthetically prepared plural gels of silica or alumina, silica and magnesia, silica-alumina and magnesia, silica zirconia, silica titania, silica-alumina-zirconia, and the like. Synthetic crystalline zeolite cracking catalysts having substantially uniform pore sizes can also be used. The siliceous component of the support can form about 5 to 90 percent of the total composition of the support, with the balance of the support composition being made up of the additional component or components of the types indicated above. Generally speaking, the support should have a cracking activity index of above 35 percent and preferably above 45 percent. The expression "cracking activity index" is used in its conventional sense to indicate the volume percent conversion obtained under standard test conditions. The standard test conditions referred to herein are those of the Kellogg Cracking Activity Test, which conditions are described in U.S. Patent No. 3,078,221. The cracking supports whose use is included by the present invention are desirably promoted in their cracking activity by the presence of a halogen such as fluorine or chlorine to a level of about 1 percent to 8 percent.

The tungsten trioxide hydrogenating component can be composited with the cracking support in any suitable manner. For example, the cracking support can be impregnated with a water-soluble tungsten salt such as tungsten nitrate or ammonium metatungstate, following which the impregnated catalyst is dried or calcined in air or other oxygen-containing gas to form tungsten trioxide. Alternatively, the tungsten component can be co-precipitated with the synthetically prepared siliceoous cracking support and calcined in air or other oxygen-containing gas to form tungsten trioxide. It is important that the tungsten hydrogenating component be present in a fully oxided form prior to sulfiding in accordance with the present invention, since sulfided tungsten catalysts prepared from tungsten in other forms, for example, prereduced tungsten trioxide, in accordance with the activation method of this invention, do not produce equivalent results. The tungsten component can be present in the composite catalyst in any amount sufficient to impart hydrogenating activity thereto. In general, amounts in the range of about 3 to 35 percent, calculated as metals, by weight of the support are satisfactory, with amounts of about 8 to 20 percent being preferred.

In accordance with the present invention, the composite tungsten oxide catalysts are sulfided using a mixture containing chiefly hydrogen or a hydrogen-rich gas in admixture with a minor proportion of a sulfiding agent. The hydrogen component of the sulfiding gas need not be pure and can contain up to 30 percent or more of other gases, for example, methane or other hydrocarbon gases, of the kind and in the proportion usually occurring in the hydrogen that is available in refineries, e.g., reformer hydrogen. The use of a minor proportion of the sulfiding agent in the sulfiding gas is important for purposes of this invention, catalysts having markedly superior activities being obtained therewith. The preferred sulfiding agents containing sulfur in the divalent form, for example, thiophenols, mercaptans, alkyl sulfides, and even sulfur-containing hydrocarbon oils, for example, oils having a sulfur content in excess of about 0.2 percent, can be used. In fact, elemental sulfur can be used as the sulfiding agent, although in this instance, it may be desirable also to utilize a flushing agent to remove excess, uncombined elemental sulfur prior to use of the catalysts in a hydrocracking reaction, so as to avoid undue contamination of products. Within the limits indicated, the proportion of the sulfiding agent in the hydrogen gas can vary depending upon the nature of the sulfiding agent. When the sulfiding agent is hydrogen sulfide, we prefer that the concentration of the hydrogen sulfide be in the range of about 1 to 30 percent by volume of the sulfiding gas mixture, and particularly good results are obtained when the hydrogen sulfide concentration is in the range of about 10 to 15 percent. Other sulfiding agents can be employed in proportions equivalent to, i.e., capable of yielding the above-indicated proportions of hydrogen sulfide.

The sulfiding of the tungsten oxide should be carried out at temperatures in the range of about 300° to 900° F., with especially active catalysts being obtained in the range of about 400° to 800° F. Sulfiding temperatures in excess of about 900° F. can be accompanied by a decrease in activity. It is also important for the purposes of the present invention that the sulfiding of the tungsten oxide composite catalysts be carried out at elevated pressure, i.e., above about 100 p.s.i.g. Good results are obtainable by pressures in the range of about 200 to 1000 p.s.i.g. with outstanding results being obtained at pressures of about 250 to 650 p.s.i.g. Similarly, excellent results have been obtained by the use of space velocities in the range of about 1000 to 3000 volumes of sulfiding gas per volume of catalyst per hour, but higher and lower space velocities can be used. For example, the sulfiding gas mixture can be utilized at the rate of 100 to 10,000 volumes of gas per volume of catalyst per hour. The tungsten oxide composite catalysts referred to above can be activated with the sulfiding gas referred to above for any period of time sufficient to convert a substantial portion of the tungsten oxide to the active oxygen-containing sulfided form. The optimum period of contact of the tungsten oxide composite catalyst with the sulfiding gas mixture will depend to some extent upon the sulfiding conditions and upon the nature of the sulfiding agent, as well as the space velocity, with relatively longer sulfiding periods being required for less severe conditions and less active sulfiding agents. By way of illustration, when hydrogen sulfide is used as the sulfiding agent in the proportion of about 10 to 15 percent of the sulfiding gas mixture, good results are obtainable in as little as about 15 minutes to ½ hour at sulfiding temperatures of about 600° to 800° F., but we prefer to carry out sulfiding for at least about one hour. When lower temperatures and smaller proportions of sulfiding agent are used, longer periods may be required. Normally it will not be necessary to carry out sulfiding for more than about 24 hours, as no further improvement in catalyst activity will be obtained by the use of further sulfiding periods.

As indicated previously, the activated, tungsten-containing, composite catalysts of this invention are especially useful in the hydrocracking of hydrocarbon oil distillates containing not more than about 15 p.p.m. of nitrogen, preferably less than 1 p.p.m. of nitrogen, and boiling above 400° F. to produce products at least 40 percent of which boil below the initial boiling point of the feed stock. Examples of suitable charge stocks are furnace oils, virgin gas oils and catalytically cracked fuel stocks that have been hydrofined to reduce the nitrogen content to not more than 15 p.p.m. in conventional manner, for example, with a cobalt-molybdenum, nickel-cobalt-molybdenum, or nickel-tungsten catalyst on an alumina or silica-alumina support at temperatures of 500° to 800° F., hydrogen partial pressures of 500 to 2500 p.s.i.g., liquid hourly space velocities of 0.2 to 10, and using about 4000 to 20,000 s.c.f. of hydrogen/bbl. of oil. Especially advantageous results are obtained when the hydrocracking of these low-nitrogen content oils is effected at relatively mild conditions, for example, in the range of about 600° to 750° F., with a significant part of the onstream cycle being spent at temperatures below about 650° F., at hydrogen partial pressures in the range of about 750 to 2000 p.s.i.g., and at liquid hourly space velocities in the range of about 0.5 to 8, preferably in the range of about 1 to 5 liquid volumes of oil per volume of catalyst per hour.

The importance of the presence of tungsten trioxide in the composite catalyst prior to sulfiding has been demonstrated experimentally by comparison of separate samples of a sulfided tungsten-containing catalyst composited with a silica-alumina acidic cracking carrier containing 2 percent fluorine, where one sample was sulfided with the tungsten in a less than fully oxided state. Each sample of catalyst contained 19 percent tungsten originally as tungsten trioxide. However, one sample of the catalyst was prereduced with hydrogen for one hour at 800° F. prior to activation by sulfiding. Both samples of catalyst were then sulfided at 800° F. and at 500 p.s.i.g. for one hour with a sulfiding mixture containing 85 percent hydrogen and 15 percent hydrogen sulfide, utilizing a space velocity of 1780 volumes of sulfiding gas per volume of catalyst per hour. Both catalyst samples were compared for hydrocracking activity with respect to a pretreated fluid catalytically cracked furnace oil containing less than 1 p.p.m. nitrogen at a temperature of 600° F., a hydrogen partial pressure of 1000 p.s.i.g., at a liquid hourly space velocity of one liquid volume of oil per volume of catalyst per hour, and utilizing a hydrogen to oil ratio of 10,000 s.c.f. of hydrogen per barrel of oil. The relative activity of the catalysts so tested is shown by the results set forth in the following table:

TABLE I

Conversion, percent by volume material boiling <400° F.
With hydrogen reduction prior to sulfiding _____ 28
With no hydrogen reduction prior to sulfiding _____ 88

From a comparison of the results set forth in the preceding table, it will be evident that the tungsten trioxide composite catalyst that was sulfided in accordance with the method of this invention was markedly more active for hydrocracking a low-nitrogen feed stock at mild processing conditions than a reduced tungsten composite catalyst that had been sulfided under the same conditions. This fact, together with the fact that tungsten trioxide as such, is known to have little hydrocracking activity for low-nitrogen content distillate hydrocarbon oils at the mild hydrocracking conditions used is strongly indicative of the presence of a sulfided oxygen-containing complex in the catalysts of this invention.

The selectivity of the herein-disclosed activating method for composited catalysts containing only tungsten as the hydrogenating component has been demonstrated by hydrocracking a pretreated catalytically cracked furnace oil containing less than 1 p.p.m. nitrogen at 600° F., at a hydrogen partial pressure of 1000 p.s.i.g., with a hydrogen:oil ratio of 10,000 s.c.f. H₂/bbl., utilizing on the one hand a sulfided tungsten trioxide catalyst, prepared in accordance with this invention, supported on a cracking catalyst containing 75 percent silica, 25 percent alumina and 2 percent fluorine, and on the other hand a sulfided commercial hydrocracking catalyst containing a combination of tungsten and another hydrogenating component supported on the same cracking base. Each of the catalysts was sulfided with a mixture of 85 percent hydrogen and 15 percent hydrogen sulfide, both in accordance with the method of this invention and also at other conditions of temperature and pressure. The comparative activities of these catalysts as well as the effects of variations in temperature and pressure on the catalyst activation method of this invention are demonstrated by the results set forth in the following table:

TABLE II

| | Conversion, Percent by Volume Material Boiling <400° F. | | | |
|---|---|---|---|---|
| Sulfiding Pressure, p.s.i.g. | 0 | 250 | 500 | 750 |
| 19% W Catalyst, LHSV=1.0: | | | | |
| 400° F | | | 75 | |
| 600° F | 42 | | 87 | |
| 800° F | | 88 | 88 | 77 |
| 1,000° F | | | 37 | |
| Commercial Hydrocracking Catalyst, LHSV =2.0: | | | | |
| 600° F | 59 | 61 | | |

From a comparison of the results obtained by sulfiding the tungsten trioxide catalyst at atmospheric pressure and at 250 p.s.i.g., a pressure representative of the herein-disclosed range, it will be seen that the activity of the sulfided tungsten oxide catalyst was more than doubled by the use of the elevated pressure. In contrast, a comparison of the results obtained with the commercial hydrocracking catalyst when presulfiding was carried out at atmospheric pressure and at the same pressure, shows that no signifiicant improvement was obtained by the use of the herein-disclosed activating procedure with the commercial catalyst. Hence, the herein-disclosed activating procedure is not effective to improve the conversion activity of all tungsten-containing catalysts. Comparison of the results obtained with the tungsten catalyst by presulfiding at various temperatures shows that active catalysts of optimum activity are obtained by presulfiding temperatures in the range of about 300° to 900° F. and that catalysts of greatest activity are obtained when presulfiding is carried out in the range of about 600° and 800° F. Comparison of the results obtained by sulfiding the tungsten oxide catalyst at various elevated pressures shows that good results in accordance with the invention are obtained by presulfiding in the range of about 100 to 1000 p.s.i.g. and that catalysts of greatest activity are obtained at pressures in the range of about 250 and 650 p.s.i.g.

The importance of the relatively low proportions of sulfiding agent with respect to hydrogen gas in the sulfiding gas mixture utilized in the present invention has been demonstrated experimentally. Thus, a catalyst containing 19 percent tungsten as tungsten trioxide supported on silica-alumina was sulfided for one hour at 600° F. and at a pressure of 175 p.s.i.g., with a mixture of 95 percent hydrogen sulfide and 5 percent hydrogen. This catalyst was then used to hydrocrack the same feed, under the same conditions employed in the runs shown in Table II. The conversion obtained was 55 percent by volume of the feed. In contrast, as shown in Table II, when the same starting catalyst was sulfided at similar conditions of temperatures and pressures, but utilizing a sulfiding gas mixture of 85 percent hydrogen and 15 percent hydrogen sulfide, and thereafter was used to hydrocrack the same feed stock under the same conditions, a conversion of 88 percent by volume of the feed was obtained. Thus, the use of minor proportions of sulfiding agent in the sulfiding gas mixture in accordance with this invention results in catalysts of unusual activity.

The catalyst activation procedure, the improved catalysts, and the hydrocracking process of this invention can be further understood by reference to the following illustrative examples:

Example I

A fluid catalytically cracked furnace oil that had been pretreated by hydrogenation to decrease its nitrogen content to less than 1 p.p.m. nitrogen was hydrocracked at 650° F., 1200 p.s.i.g. hydrogen partial pressure, at a liquid hourly space velocity of 1.5 liquid volumes of oil per volume of catalyst per hour, utilizing a hydrogen to oil ratio of 10,000 s.c.f. H₂/bbl. The hydrocracking catalyst was a sulfided tungsten trioxide catalyst containing 19 percent tungsten and 2 percent fluorine, composited with a silica-alumina cracking support containing 75 percent silica and 25 percent alumina and having a cracking activity index of 70 on the Kellogg scale that had been prepared by sulfiding the tungsten component while in the form of tungsten trioxide with a mixture of 15 percent hydrogen sulfide and 85 percent hydrogen for 2 hours at 800° F. and 500 p.s.i.g., using a space velocity of 1240 volumes of sulfiding gas per volume of catalyst per hour. The conversion of the feed stock to products boiling below 400° F. was 70 percent during the 10 to 20 hour period as measured by an ASTM D-86 distillation on the total liquid product. After 100 hours of operation at the above conditions, the conversion of the feed stocks to products boiling below 400° F. was 68 percent, which corresponds to a decrease in activity with age of less than 3 percent. Thus, long catalyst life can be attained using a supported tungsten catalyst, sulfided according to the above conditions. In addition, in the run described, only 52.5 percent by volume of the aromatic compounds in the feed stock were hydrogenated.

In contrast, the commercial, hydrocracking catalyst referred to above, which had been presulfided at 600° F. and at atmospheric pressure using a mixture of 73 percent hydrogen and 27 percent hydrogen sulfide for 3 hours at a space velocity of 2220 volumes of sulfiding gas per volume of catalyst per hour, was found to hydrogenate 74.7 percent by volume of the aromatics in the feed stock at about the same level of hydrocracking conversion. The lower aromatics saturation activity of the sulfided tungsten catalyst is advantageous because it results in a higher octane number gasoline and a lower consumption of hydrogen.

The outstanding conversion activity of the sulfided tungsten oxide catalysts disclosed herein occurs only in conjunction with low-nitrogen content feed stocks. When high-nitrogen feed stocks are employed, catalysts that have been sulfided in accordance with the present invention not only do not show the same characteristic high conversion activity, but in fact may show an even lower conversion activity than catalysts that have been sulfided by other methods.

By way of illustrating the above-indicated coaction, a sample of a catalyst containing 19 percent tungsten as the trioxide and 2 percent fluorine composited with a commercial silica-alumina cracking catalyst was sulfided for 2 hours in accordance with this invention at 600° F. and at a pressure of 250 p.s.i.g., with a mixture of 85 percent hydrogen and 15 percent hydrogen sulfide, at a space velocity of 2660 s.c.f. gas/cu. ft. of catalyst/hr. Another sample of the same starting catalyst was sulfided for one hour at 600° F. and at atmospheric pressure with a mixture of 92 percent hydrogen and 8 percent hydrogen sulfide, at a space velocity of 2660 s.c.f./cu. ft. of catalyst/hr. Each of these catalysts was then used to hydrocrack a fluid catalytically cracked furnace oil containing 360 p.p.m. nitrogen at a temperature of 750° F., a hydrogen partial pressure of 1750 p.s.i.g., and a space velocity of 1.5 liquid volumes of feed per volume of catalyst per hour, using a hydrogen:oil ratio of 10,000 s.c.f./bbl. Comparing the yields of products obtained in the 10 to 30 hour range, it was found that only 25 percent conversion to products boiling below 400° F. was obtained with the catalysts of this invention, whereas 40 percent conversion was obtained with the catalyst sulfided in a different manner. By comparison with the unusually high conversion activity demonstrated in Table II for catalysts sulfided in accordance with the present invention in conjunction with low-nitrogen feed stocks, it will be seen that the improvement in conversion activity for the sulfided tungsten oxide catalysts of this invention is peculiar to low-nitrogen content feed stocks.

Example II

Another fluid catalytically cracked furnace oil that had been pretreated by hydrogenation to decrease its nitrogen content to less than 1 p.p.m., and containing 58 percent aromatics, was hydrocracked at 650° F., 1000 p.s.i.g., hydrogen partial pressure at a space velocity of 2.0 liquid volumes of oil per volume of catalyst per hour, utilizing a hydrogen-to-oil ratio of 10,000 s.c.f. H₂/bbl. The hydrocracking catalyst was a sulfided tungsten trioxide catalyst containing 19 percent tungsten and 2 percent fluorine composited with a silica-alumina cracking support containing 65 percent silica and 35 percent alumina and having a cracking activity index of 71 percent on the Kellogg scale, that had been prepared by sulfiding the tungsten component while in the form of tungsten trioxide with a mixture of 15 percent hydrogen sulfide and 85 percent hydrogen for 2 hours at 800° F. and 500 p.s.i.g. using a space velocity of 1650 volumes of sulfiding gas per volume of catalyst per hour. Throughout the run, 1500 p.p.m. sulfur as carbon disulfide was added to the feed stock to maintain the sulfided tungsten catalyst in the preferred sulfided state. The conversion of the feed stock to products boiling below 400° F. was 65 percent during the 10-20 hour period as measured by an ASTM D-86 distillation on the total liquid products. The hydrogen consumption for this run was 730 s.c.f./bbl. of oil feed. The naphtha product boiling between 180° and 400° F. contained 44 percent aromatics and, after addition of 3 cc. TEL/gal., had a Research Octane Number of 94.4 and a Motor Octane Number of 85.6. Thus, the catalysts of this invention show unusually low aromatics saturation activity with a correspondingly low hydrogen consumption and high naphtha product octane number.

Example III

In another embodiment of this invention, the same type of feed stock as employed in Examples I and II was hydrocracked at 750° F., 1750 p.s.i.g. hydrogen partial pressure, at a liquid hourly space velocity of 4 liquid volumes of oil per volume of catalyst per hour, and utilizing a hydrogen to oil ratio of 10,000 s.c.f. H₂/bbl. of oil. Using the specially sulfided tungsten catalyst of Example I, the conversion during the 10-20 hour period was 85 percent. After 100 hours at the conditions indicated, the conversion had decreased to only 80 percent, a decrease of only 5 percent. In addition, hydrogen was consumed in the process at the rate of only 1015 s.c.f./bbl. of oil, and a naphtha cut was obtained containing 36.5 percent by volume aromatics and having a Research Octane Number of 92.7, after addition of tetraethyl lead in the proportion of 3 cc./gal.

In contrast, when the same charge stock was hydrocracked under the same conditions with the commercial, sulfided hydrocracking catalyst referred to above, the conversion after 100 hours had decreased by 10 percent. In addition, the hydrogen consumption with the commercial catalyst was found to be 1535 s.c.f./bbl. of oil, and the naphtha product was found to contain only 17.3 percent by volume aromatics and to have a Research Octane Number of only 83.7, after addition of tetraethyl lead in the proportion of 3 cc./gal.

Example IV

The sulfided tungsten trioxide catalyst described in Example I was subjected to a number of coking and regeneration cycles. In all cases, the coke was deposited on the catalysts by hydrocracking a pretreated FCC furnace oil containing less than 1 p.p.m. nitrogen at 750° F., 100 p.s.i.g., 0.5 LHSV, and a hydrogen rate of 10,000 s.c.f./bbl. for 2 hours. The coke was then removed by combustion using a mixture of air and nitrogen at atmospheric pressure and regulating the air-nitrogen mixture so as to maintain a temperature of not over 900° F. in the catalyst bed. The catalysts were tested for hydrocracking activity after every other cycle. After four such cycles, the catalyst of the invention was found to have lost only about 14 percent of its conversion activity at the same hydrocracking conditions. In contrast, after four such cycles using the commercial hydrocracking catalyst referred to above, after sulfiding in the same manner, the commercial catalyst was found to have lost about 33 percent of its conversion activity at the same hydrocracking conditions.

It will be understood that the foregoing specific embodiments are illustrative only and are not intended to be limiting. Accordingly, similarly advantageous results can be obtained by the use of other proportions of tungsten, other sulfiding conditions within the range disclosed herein, by the use of other hydrocracking conditions, and other feed stocks disclosed herein. Although the presulfiding method disclosed herein is especially useful in connection with the tungsten catalysts disclosed herein, it can also be used for sulfiding other composite hydrocracking catalysts containing other hydrogenating metals.

We claim:

1. A hydrocracking method comprising contacting a low-nitrogen distillate hydrocarbon oil feed stock with hydrogen at hydrocracking conditions and with a sulfided tungsten hydrocracking catalyst prepared by contacting a composite consisting essentially of tungsten oxide and an active, silica alumina cracking catalyst having an activity index of at least about 35 and containing about 5 percent to 90 percent silica, with a sulfiding gas mixture containing chiefly hydrogen, in admixture with a minor proportion of a sulfiding agent, at a temperature in the range of about 300° to 900° F. and at a pressure of about 100 to 1000 p.s.i.g., for a period sufficient to sulfide at least a substantial portion of the tungsten oxide, said contact of feed stock and catalyst being carried out to form products of lower boiling range than the feed stock.

2. A hydrocracking method comprising contacting a low-nitrogen distillate hydrocarbon oil feed stock containing not more than about 15 p.p.m. nitrogen with hydrogen at a temperature in the range of about 600° to 750° F., at a hydrogen partial pressure in the range of about 750 to 2000 p.s.i.g., and at a space velocity in the range of about 0.5 to 8 liquid volumes of feed per volume of catalyst per hour, and with a sulfided tungsten hydrocracking catalyst prepared by contacting a composite consisting essentially of tungsten oxide and an active silica alumina cracking catalyst having an activity index of at least about 35 and containing about 5 percent to 90 percent silica, with a sulfiding gas mixture containing chiefly hydrogen in admixture with a minor proportion of a sulfiding agent, at a temperature in the range of about 300° to 900° F. and at a pressure of about 100 to 1000 p.s.i.g. for a period sufficient to sulfide at least a substantial portion of the tungsten oxide, said contacting of feed stock and catalyst being carried out to form products of lower boiling range than the feed stock.

3. A sulfided tungsten hydrocracking catalyst prepared by contacting a composite consisting essentially of tungsten oxide and an active, silica alumina cracking catalyst having an activity index of at least about 35 and containing about 5 percent to 90 percent silica with a sulfiding gas mixture containing chiefly hydrogen, in admixture with a minor proportion of a sulfiding agent, at a temperature in the range of about 300° to 900° F., and at a pressure of about 100 to 1000 p.s.i.g. for a period sufficient to sulfide at least a substantial portion of the tungsten oxide.

4. A method of presulfiding a hydrocracking catalyst consisting essentially of tungsten oxide composited with an active, silica alumina cracking catalyst having an activity index of at least about 35 and containing about 5 percent to 90 percent silica, with a sulfiding gas mixture containing chiefly hydrogen, in admixture with a minor proportion of a sulfiding agent at a temperature in the range of about 300° to 900° F. and at a pressure of about 100 to 1000 p.s.i.g. for a period sufficient to sulfide at least a substantial portion of the tungsten oxide.

5. A method of sulfiding a tungsten hydrocracking catalyst consisting essentially of tungsten in oxide form composited with an active, silica alumina cracking catalyst having an activity index of at least about 35 and containing about 5 percent to 90 percent silica, with a sulfiding gas mixture containing chiefly hydrogen, in admixture with a minor proportion of a sulfiding agent containing divalent sulfur in an amount equivalent to 1 to 30 percent hydrogen sulfide by volume of the sulfiding gas mixture, at a temperature in the range of about 400° to 800° F., at a pressure in the range of about 250 to 650 p.s.i.g., at a space velocity in the range of about 100 to 100,000 standard cubic feet of sulfiding gas per cubic foot of catalyst per hour, for a period sufficient to sulfide at least a substantial portion of the tungsten oxide, said period being in the range of about 15 minutes to 24 hours.

6. The process of claim 5 where the sulfiding gas mixture contains chiefly hydrogen, in admixture with about 1 to 30 percent hydrogen sulfide.

7. A hydrocracking method comprising contacting a low-nitrogen distillate hydrocarbon oil feed stock with hydrogen at hydrocracking conditions and with a sulfided tungsten hydrocracking catalyst prepared by contacting a composite consisting essentially of tungsten oxide and an active silica alumina cracking catalyst having an activity index of at least about 35 and containing about 5 percent to 90 percent silica, with a sulfiding gas mixture consisting essentially of hydrogen in admixture with a minor proportion of a sulfiding agent, at a temperature in the range of about 300° F. to 900° F. and at a pressure of about 100 to 1000 p.s.i.g., for a period sufficient to sulfide at least a substantial portion of the tungsten oxide, said contact of said stock and catalyst being carried out to form products of lower boiling range than the feed stock.

8. A sulfided tungsten hydrocracking catalyst prepared by contacting a composite consisting essentially of tungsten oxide and an active, silica alumina cracking catalyst having an activity index of at least about 35 and containing about 5 percent to 90 percent silica, with a sulfiding gas mixture consisting essentially of hydrogen in admixture with a minor proportion of a sulfiding agent, at a temperature in the range of about 300° F. to 900° F., and at a pressure of about 100 to 1000 p.s.i.g. for a period sufficient to sulfide at least a substantial portion of the tungsten oxide.

9. A method of presulfiding a hydrocracking catalyst consisting essentially of a tungsten oxide composited with an active, silica alumina cracking catalyst having an activity index of at least about 35 and containing about 5 percent to 90 percent silica, with a sulfiding gas mixture consisting essentially of hydrogen in admixture with a minor proportion of a sulfiding agent, at a temperature in the range of about 300° F. to 900° F., and at a pressure of about 100 to 1000 p.s.i.g., for a period sufficient to sulfide at least a substantial portion of the tungsten oxide.

References Cited by the Examiner

UNITED STATES PATENTS 3,099,617   7/1963   Tulleners _____ 208—109
3,213,012   10/1965  Kline et al. _____ 208—111

DELBERT E. GANTZ, *Primary Examiner.*

ABRAHAM RIMENS, *Examiner.*

UNITED STATES PATENT OFFICE
CERTIFICATE OF CORRECTION

Patent No. 3,294,674                      December 27, 1966

Harold Beuther et al.

It is hereby certified that error appears in the above numbered patent requiring correction and that the said Letters Patent should read as corrected below.

Column 1, line 64, for "activate" read -- active --; column 3, line 18, for "zeolite" read -- zeolitic --; line 73, after "sulfiding" insert -- agent is hydrogen sulfide. However, other sulfiding --.

Signed and sealed this 12th day of September 1967.

(SEAL)
Attest:

ERNEST W. SWIDER                      EDWARD J. BRENNER
Attesting Officer                      Commissioner of Patents